United States Patent [19]
Hashimoto

[11] Patent Number: 5,262,850
[45] Date of Patent: Nov. 16, 1993

[54] PHOTOELECTRIC CONVERTING DEVICE HAVING REDUCED LINE SENSOR SPACE

[75] Inventor: Seiji Hashimoto, Yokohama, Japan

[73] Assignee: Canon Kabushiki Kaisha, Tokyo, Japan

[21] Appl. No.: 879,462

[22] Filed: May 4, 1992

Related U.S. Application Data

[63] Continuation of Ser. No. 408,531, Sep. 18, 1989, abandoned.

[30] Foreign Application Priority Data

| Sep. 20, 1988 [JP] | Japan | 63-233461 |
| Sep. 21, 1988 [JP] | Japan | 63-234945 |
| Sep. 22, 1988 [JP] | Japan | 63-236587 |

[51] Int. Cl.⁵ .................................. H04N 1/46
[52] U.S. Cl. ..................... 358/500; 358/213.22; 358/213.27; 358/483
[58] Field of Search ........... 358/75, 213.11, 213.19, 358/213.22, 213.27, 482, 483

[56] References Cited

U.S. PATENT DOCUMENTS

| 4,437,112 | 3/1984 | Tanaka et al. | 358/44 |
| 4,567,510 | 1/1986 | Tanaka et al. | 358/44 |
| 4,603,354 | 7/1986 | Hashimoto et al. | 358/213 |
| 4,658,287 | 4/1987 | Chen | 358/213.22 X |
| 4,712,135 | 12/1987 | Hashimoto et al. | 358/213.22 |
| 4,734,582 | 3/1988 | Gibbons et al. | 358/213.19 X |
| 4,768,085 | 8/1988 | Hashimoto | 358/48 |
| 4,810,896 | 3/1989 | Tanaka et al. | 358/213.11 X |
| 4,835,404 | 5/1989 | Sugawa et al. | 358/213.27 X |
| 4,857,981 | 8/1989 | Matsumoto et al. | 357/24 LR X |
| 4,866,293 | 9/1989 | Nakamura et al. | 358/213.19 |
| 4,868,405 | 9/1989 | Nakamura | 358/213.11 |
| 4,959,723 | 9/1990 | Hashimoto | 358/213.11 |
| 4,967,067 | 10/1990 | Hashimoto et al. | 358/213.27 X |
| 4,972,255 | 11/1990 | Suzuki et al. | 358/75 |
| 4,989,075 | 1/1991 | Ito | 358/213.11 |

FOREIGN PATENT DOCUMENTS 62-006252  1/1987  Japan .

Primary Examiner—Kenneth A. Wieder
Assistant Examiner—Glenn W. Brown
Attorney, Agent, or Firm—Fitzpatrick, Cella, Harper & Scinto

[57] ABSTRACT

A photoelectric converting device composed of plural line sensors, provided with a common accumulation unit for accumulating selectively the signals from the line sensors, and an output unit for successively outputting the signals of the accumulation unit.

25 Claims, 15 Drawing Sheets

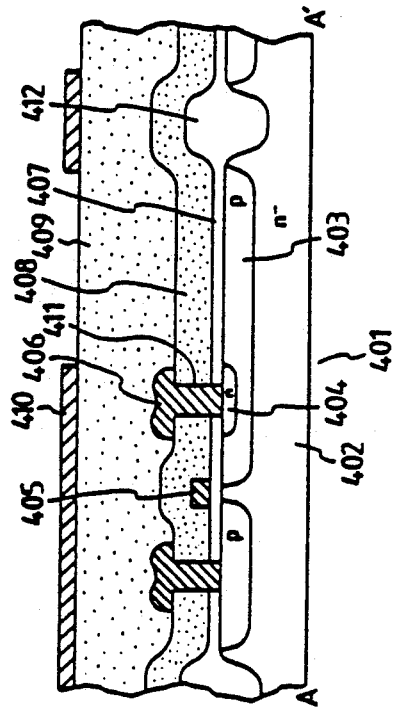
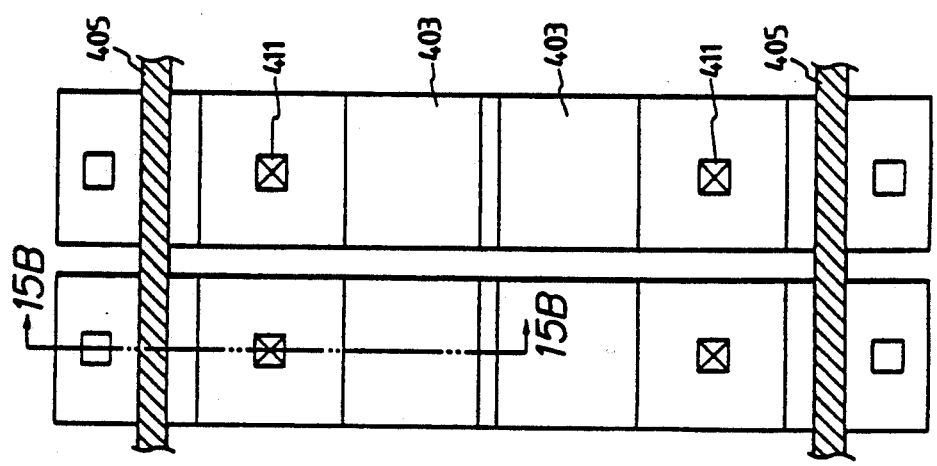
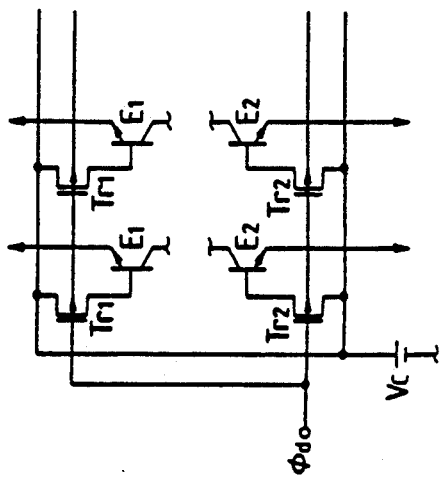

PHOTOELECTRIC CONVERTING DEVICE HAVING REDUCED LINE SENSOR SPACE

This application is a continuation of application Ser. No. 07/408,531 filed Sep. 18, 1989, now abandoned.

BACKGROUND OF THE INVENTION

1. Field of the Invention

The present invention relates to a photoelectric converting device, and more particularly to a photoelectric converting device composed of plural line sensors.

2. Related Background Art

Line sensors are already used in information processing apparatus such as a facsimile apparatus, and are composed for example of charge coupled devices (CCD).

An example of the CCD line sensor is shown in FIG. 17.

In a CCD sensor as shown in FIG. 17, signals from a sensor unit 1 are transferred by transfer gates 2 to two analog shift registers 3 provided respectively for even and odd pixels, then further transferred by said analog shift registers 3 and again aligned as sequential signals in an output gate 4. The signals are then amplified by a preamplifier 5 and released to the outside. The analog shift registers 3 and the transfer gates 2 are controlled by a drive pulse circuit 6.

Recent advances in image processing apparatus capable of handling color images have stimulated the demand for an image reader for color original images, and for this purpose there is employed a color image reader equipped with three parallel line sensors for respectively obtaining signals of red, green and blue.

If such a color line sensor is composed simply of the CCD line sensors of the above-explained structure, there is required a large chip since there are required large areas between the light-receiving portions.

The color line sensor is usually composed of plural line sensors for different colors, each of which is composed of a light-receiving area constituting the photoelectric conversion area, and an output area shielded from light and provided with scanning circuits, output wirings etc. When such a color line sensor is used in reading an original image, the signals of red (R), green (G) and blue (B) cannot be obtained at the same time because of the positional difference in the light-receiving areas of the line sensors of different colors, so that the signals from different line sensors have to be temporarily stored in a memory for matching the timing of signals of different colors. For reducing the cost of an image processing apparatus utilizing a color line sensor, it is desirable to reduce the number of such memories, but the output area between light-receiving areas (said output area being hereinafter called line space) must be shielded from light for reducing the number of memories.

In the following there will be explained the problems associated with the reduction in the line space, in relation to a photoelectric converting device disclosed by the assignee of the present application in Japanese Patent Application Sho 62-6252.

FIG. 18 is a cross-sectional view of a photoelectric conversion cell of the known photoelectric converting device.

On an n-type silicon substrate 101 there is formed, by epitaxial growth, an n$^-$-layer 102 constituting a collector area, in which formed are a p-base area 103 and an n$^+$-emitter area 104 to constitute a bipolar transistor. In said n$^-$-layer 102 there are further formed p$^+$-areas 105, 106 constituting drain and source areas of a p-channel MOS transistor, and a gate electrode 108 is formed across an oxide film. A transparent insulating layer 109 is formed thereon, and a drain electrode 110 and an emitter electrode 111 are formed through contact holes. There are further provided a transparent insulating layer 112 and a light shielding layer 113.

When the base area 103 is irradiated with light, carriers (holes in this case) are accumulated corresponding to the quantity of incident light, and an output signal corresponding to the amount of said carriers is read from the emitter electrode 111. The carriers accumulated in the base area 103 are released from the source area 106, by turning on the p-channel MOS transistor.

The base area 103 shown in FIG. 18 is larger than the drain/source areas 105, 106 and the emitter area 104 of the p-channel MOS transistor, but the areas of the drain/source areas 105, 106 and of the emitter area 104 are not negligible since the pitch (distance between adjacent pixels) of pixels becomes small in a line sensor with an elevated number of pixels.

In a line sensor containing only one array of pixels, the space is not a problem since it is only required to secure the apertures of the base areas of a single line, but, in a multi-line sensor containing plural arrays of pixels, the line space becomes inevitably wide because the above-mentioned drain/source areas 105, 106 and the emitter area 104 have to be formed between the lines.

SUMMARY OF THE INVENTION

An object of the present invention is to reduce the area not receiving the light in a photoelectric converting device utilizing plural line sensors and to make compact said photoelectric converting device.

Another object of the present invention is to make compact the photoelectric converting device by simplifying the wirings of the line sensors and commonly using the components of said line sensors.

Still another object of the present invention is to reduce the spaces between plural line sensors.

In one embodiment, the photoelectric converting device of the present invention utilizing plural line sensors is characterized by common accumulation means for selectively accumulating the signals from said line sensors, and output means for successive output of the signals of said accumulation means.

The photoelectric converting device of said embodiment allows a reduction of the non-photosensitive areas of the line sensors, thereby reducing the size of the chip, by commonly utilizing the accumulation means for accumulating the signals from the line sensors, thereby selectively transferring the signals from plural line sensors to the accumulation means and reading said signals in succession by the output means.

Also, in another embodiment, the photoelectric converting device of the present invention, having a structure with plural line sensors containing photoelectric conversion cells each of which comprises two main electrode areas of a same conductive type and a control electrode area of the opposite conductive type and in which an electric charge is accumulated by light irradiation of said control electrode area, is characterized by switch means in one of the said main electrode areas in each of photoelectric conversion cells in at least one of said plural line sensors.

The photoelectric converting device of this embodiment is capable of on-off modulation of the signals from said photoelectric conversion cells by means of switch means provided in one of the main electrode areas of the photoelectric conversion cells of at least one of said line sensors.

Also, in still another embodiment, the photoelectric converting device of the present invention, having a structure with plural line sensors each of which has a light-receiving area for accumulating photogenerated carriers and an output area for releasing output signals corresponding the thus accumulated carriers, is characterized by a structure wherein, in the line sensors positioned at the outside of said device, the light-receiving area is positioned inside while the output area is positioned outside The photoelectric converting device of this embodiment allows the positioning of light-receiving areas of the line sensors in mutually close relationship, thereby reducing the line spaces, by positioning, in the outside line sensors, the light-receiving areas thereof inside and the output areas thereof outside.

It is also possible to minimize the line space by separating the photoelectric conversion cells by gate-insulated transistors of which main electrode areas are composed of the opposed light-receiving areas of the neighboring line sensors and/or the neighboring light-receiving areas of the line sensors.

The foregoing and still other objects of the present invention, and the advantages thereof, will become fully apparent from the following description which is to be taken in conjunction with the attached drawings.

BRIEF DESCRIPTION OF THE DRAWINGS

FIGS. 15A, 15B and 15C are views showing a sixth embodiment of the present invention;

DETAILED DESCRIPTION OF THE PREFERRED EMBODIMENTS

Now, the present invention will be clarified in detail by embodiments thereof shown in the attached drawings.

At first there will be explained the structure of a photoelectric conversion cell of the line sensors to be employed in said embodiments. The line sensors explained herein are those disclosed by the assignee of the present application in the Japanese Patent Application Sho 59-273953, for accumulating a charge generated by photoirradiation in a semiconductor area and obtaining a signal corresponding to the amount of accumulated charge by means of a control signal. However, the present invention is applicable not only to such a line sensor to be explained in the following, but also to a MOS line sensor or the like.

Figure 1A:
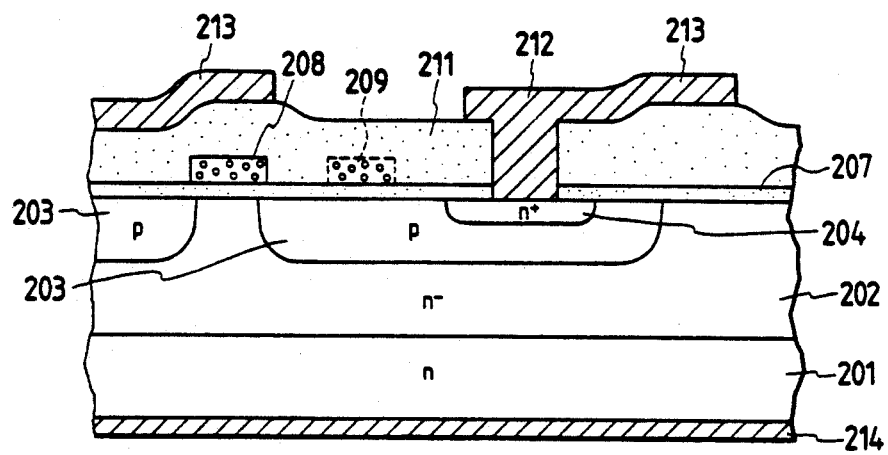
FIG. 1A is a schematic cross-sectional view of a photoelectric conversion cell to be employed in the photoelectric converting device of the present invention.
Figure 1B:
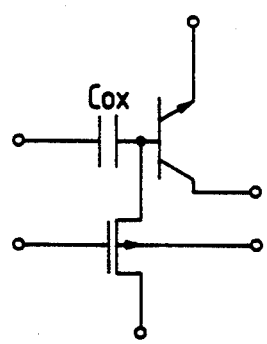
FIG. 1B is an equivalent circuit diagram of said photoelectric conversion cell.

FIG. 1A is a schematic cross-sectional view of an example of the photoelectric conversion cell to be employed in the photoelectric converting device of the present invention, and FIG. 1B is an equivalent circuit of said photoelectric conversion cell.

On an n-type silicon substrate 201, there is formed, by epitaxial growth, an $n^-$-layer 202 constituting the collector area, in which formed are a p-base area 203 and an $n^+$-emitter area 204 to constitute a bipolar transistor.

Between the neighboring p-base areas 203, there is formed a gate electrode 208 across an oxide film 207, whereby formed is a p-channel MOS transistor with said neighboring p-base areas 203 functioning as the source and drain areas.

Said MOS transistor is of a normally-off type, which is turned off when the potential of the gate electrode 208 is grounded or positive. Consequently, the p-base areas 203 of the neighboring cells are electrically separated. Said transistor is however turned on when the gate electrode 208 assumes a negative potential exceeding a threshold potential Vth, whereby the p-base areas 203 of the cells are mutually connected. The Japanese Patent Application Sho 62-017150 discloses the structure of the photoelectric conversion cell of the photoelectric converting device in which the separation is achieved by such a MOS transistor.

The gate electrodes 208 are commonly connected to an unrepresented drive line, and capacitors 209 for controlling the potential of the p-base areas 203 are connected to another unrepresented drive line. Said drive lines are formed on the oxide film.

There is further formed a transparent insulating layer 211, and an emitter electrode 212 which is connected to a vertical line 213 common for a vertical column. Also, a collector electrode 214 is formed, across an ohmic contact layer, on the rear face of the substrate 201.

Figure 2:
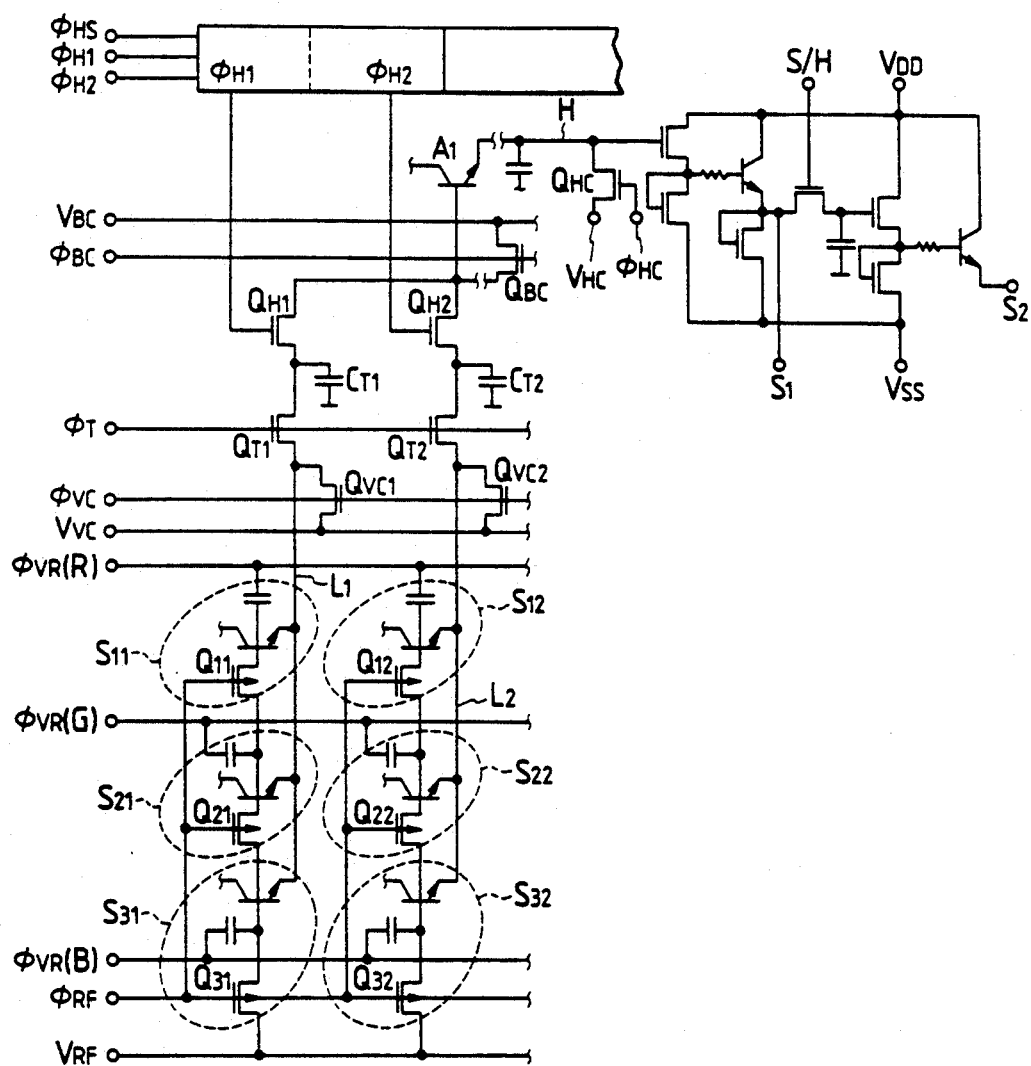
FIG. 2 is a circuit diagram of a first embodiment of the photoelectric converting device of the present invention.

FIG. 2 is a circuit diagram of a first embodiment of the photoelectric converting device of the present invention.

The present embodiment shows an example of a color line sensor, and, for the purpose of simplicity, there are illustrated only six photoelectric conversion cells $S_{11}$–$S_{32}$, namely two for each line or each color.

More specifically, the cells $S_{11}$, $S_{12}$ arranged in the main scanning direction belong to a line sensor for red (R) color; $S_{21}$ and $S_{22}$ belong to a line sensor for green (G) color; and $S_{31}$ and $S_{32}$ belong to a line sensor for blue (B) color. A constant positive voltage Vcc is applied to the collector electrodes of npn transistors of the cells $S_{11}$-$S_{32}$. The capacitor electrodes of the cells $S_{11}$, $S_{12}$ are connected in common, and are given a pulse $\phi V_R(R)$ for signal readout and refreshing. Similarly, the capacitor electrodes of the cells $S_{21}$, $S_{22}$ are given a pulse $\phi V_R(G)$, and those of the cells $S_{31}$, $S_{32}$ are given a pulse $\phi V_R(B)$. The gate electrodes of the MOS transistors $Q_{11}$-$Q_{32}$ of the cells $S_{11}$-$S_{32}$ are connected in common and are given a pulse $\phi_{RF}$ for applying a predetermined voltage $V_{RF}$. In the sub-scanning direction, the cells $S_{11}$ and $S_{21}$ are connected by the MOS transistor $Q_{11}$, and the cells $S_{21}$ and $S_{31}$ are connected by the MOS transistor $Q_{21}$. Likewise, the cells $S_{12}$ and $S_{22}$, and the cells $S_{22}$ and $S_{32}$ are respectively connected by transistors $Q_{12}$ and $Q_{22}$. As already explained in relation to FIG. 1, an element separated state and an electrically conductive state can be controlled by the gate electrodes of the MOS transistors. The emitter electrodes of the cells $S_{11}$-$S_{31}$ are connected to a vertical line L1, while those of the cells $S_{12}$-$S_{32}$ are connected to another vertical line L2. The vertical lines L1, L2 are respectively connected to accumulating capacitors $C_{T1}$, $C_{T2}$ through MOS transistors $Q_{T1}$, $Q_{T2}$, and further connected to MOS transistors $Q_{VC1}$, $Q_{VC2}$. The gate electrodes of the MOS transistors $Q_{T1}$, $Q_{T2}$ are connected in common, and receive a pulse $\phi_T$. Also, the gate electrodes of the MOS transistors $Q_{VC1}$, $Q_{VC2}$ are connected in common and receive a pulse $\phi_{VC}$ for applying a predetermined voltage $V_{VC}$ to the emitters of the cells $S_{11}$-$S_{31}$.

Also, the accumulating capacitors $C_{T1}$, $C_{T2}$ are connected respectively to MOS transistors $Q_{H1}$, $Q_{H2}$ and connected in common to a buffer transistor A1 and a MOS transistor $Q_{BC}$. Said transistors $Q_{H1}$, $Q_{H2}$ are controlled by a horizontal scanning circuit, whereby the signals accumulated in the capacitors $C_{T1}$, $C_{T2}$ are transferred in succession through the buffer A1. The MOS transistor $Q_{BC}$ is controlled by a pulse $\phi_{BC}$.

In the present embodiment, the buffer A1 is not provided for respective accumulating capacitors but are commonly connected to plural accumulating capacitors (two capacitors being illustrated) for reducing the stray capacitance.

The buffer A1 is connected to an output line H which is connected to a sample and hold circuit. Said output line H receives a predetermined potential $V_{HC}$ through a refreshing transistor $Q_{HC}$.

Figure 3:
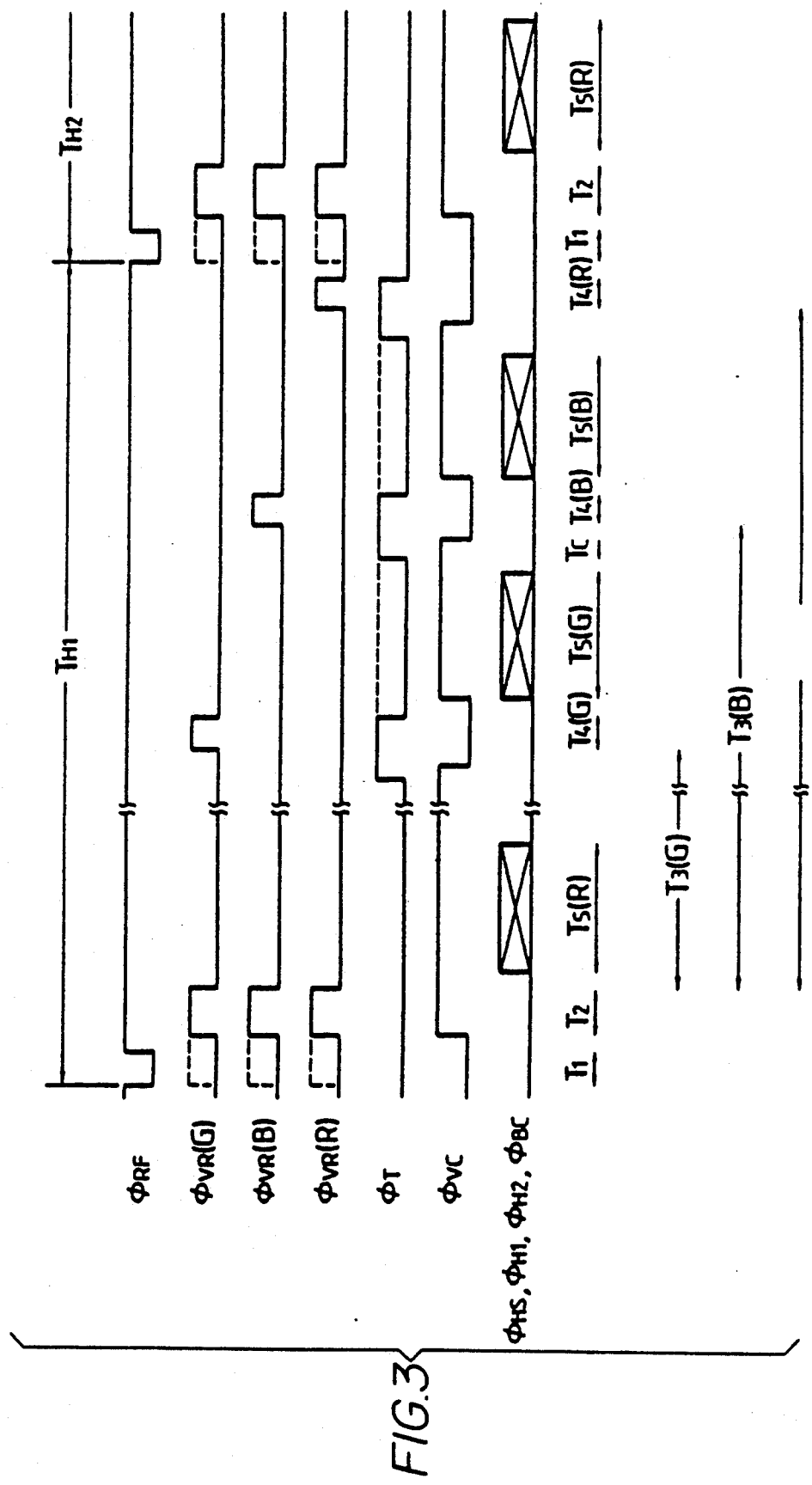
FIGS. 3, 4 and 5 re timing charts showing the functions of said photoelectric converting device.
Figure 4:
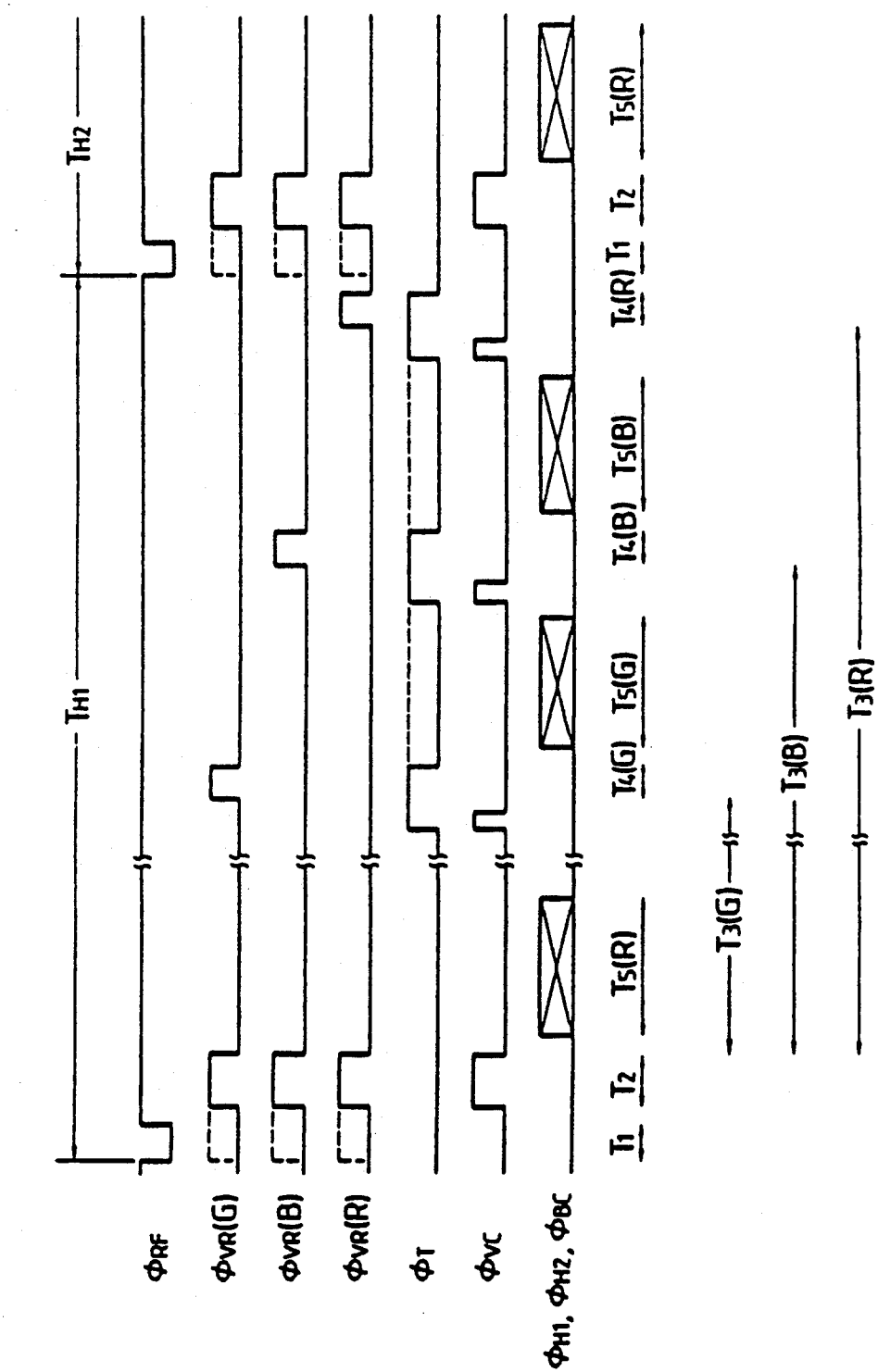
Figure 5:
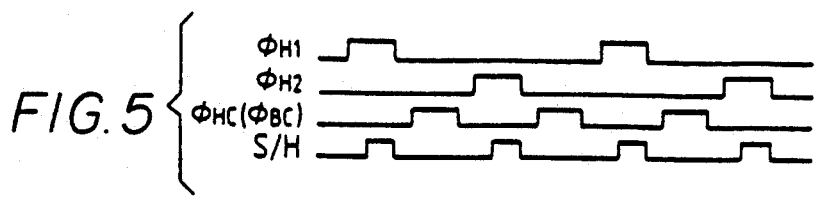

FIGS. 3 and 4 and 5 are timing charts showing the functions of the photoelectric converting device explained above.

In FIGS. 3 and 4, $T_H$ indicates a period for refreshing, accumulation, signal transfer and signal readout.

At first, the pulse $\phi_{RF}$ is shifted to L-level state to reset the bases of the sensor to a reference voltage $V_{RF}$. This period is called a complete refreshing period $T_1$.

Then, the MOS transistors $Q_{VC1}$, $Q_{VC2}$ connected to the vertical lines L1, L2 are turned on by a pulse $\phi_{VC}$, thereby bringing the emitters of the npn transistors of the cells $S_{11}$-$S_{31}$ to a potential $V_{VC}$. Then, pulses $\phi_{VR}(R)$, $\phi_{VC}(G)$ and $\phi_{VR}(B)$ are supplied to bring the bases of the npn transistors of the cells $S_{11}$-$S_{31}$ to a predetermined potential $V_B$ ($>V_{VC}$) through a capacitance $C_{OX}$. The holes accumulated in the base are dissipated by recombination with electrons injected from the emitter. This period is called a transient refresh period $T_2$. This transient refreshing reduces the base potential, whereby the fluctuation in the base potential of the cells $S_{11}$-$S_{32}$ is reduced.

Then the pulses $\phi V_R(R)$, $\phi V_R(G)$, $\phi V_R(B)$ are shifted to the L-level state while the MOS transistors $Q_{VC1}$, $Q_{VC2}$ are maintained in an on-state and the emitters of the npn transistors are maintained at the potential $V_{VC}$ (as shown in FIG. 3), whereby the bases of the npn transistors are inversely biased to a negative potential with respect to the emitters.

When the light enters the light receiving areas of the cells $S_{11}$-$S_{31}$, carriers corresponding to the amounts of incident light are accumulated in the bases in an accumulating period $T_3$. During the accumulating operation, the emitters of the npn transistors are brought to a potential $V_{VC}$, in order to cause an overflow in response to the strong incident light, thereby preventing false signals. In office automation equipment, since the saturation of the sensors does not occur in normal conditions, the MOS transistors $Q_{VC1}$, $Q_{VC2}$ are turned off to maintain the emitters of the npn transistors in the floating state.

The photoelectric conversion cells $S_{11}$-$S_{31}$ can thus be shifted to the accumulation state. In the photoelectric converting device of the present embodiment, the signal corresponding to the charge accumulated in the base of each cell can be selectively read for each cell, because the base potential $V_B$ of the npn transistors of the cells $S_{11}$-$S_{31}$ is inversely biased with respect to the emitter, so that the signal readout does not take place unless said base is forcibly biased in the forward direction with respect to the emitter. Therefore, the signal readout can be basically made from any line sensor. However, in order to balance the signal levels of different colors as far as possible, the signals are in the order of G, B and R in the present embodiment.

After the charge accumulation in the G cell $S_{21}$, $S_{22}$ and prior to the readout of the signals corresponding to the accumulated charges, the MOS transistors $Q_{T1}$, $Q_{T2}$ are turned on by a pulse $\phi_T$ while the MOS transistors $Q_{VC1}$, $Q_{VC2}$ are turned on by a pulse $\phi_{VC}$, in order to eliminate the charges remaining in the capacitors $C_T$. Subsequently, the pulse $\phi V_R(G)$ is shifted to the H-level state to apply forward bias to the bases of the G cells $S_{21}$, $S_{22}$ only, whereby the signals are transferred to the accumulating capacitors $C_{T1}$, $C_{T2}$ (transfer period $T_4$).

Then, by the scanning function of the horizontal scanning circuit, the charges of the accumulating capacitors $C_{T1}$, $C_{T2}$ are read in succession from the chip, through the buffer A1 and the sample hold circuit (readout period $T_5$).

In this operation, the charge accumulated in the stray capacitance of the output line H is reset to the predetermined potential $V_{HC}$ by the transistor $Q_{HC}$, whenever the signal from either capacitor is read by the pulse $\phi_{H1}$ or $\phi_{H2}$ applied to the horizontal scanning circuit. The sample and hold (S/H) signal is released in synchronization with the pulses $\phi_{H1}$, $\phi_{H2}$.

Then, the charge accumulation for the B cells $S_{31}$, $S_{32}$ is completed, and there are conducted the transfer and readout of signals corresponding to the accumulated charges.

The charges remaining on the vertical lines L1, L2 and in the accumulating capacitors $C_{T1}$, $C_{T2}$ are cleared prior to the signal transfer, and the pulse $\phi V_R(B)$ is turned on to transfer the charges to the accumulating capacitors $C_{T1}$, $C_{T2}$. After said transfer, the signal readout is conducted in a similar manner as in the G signal readout.

After the B signal readout, there are conducted the transfer and readout of the R signals of the R cells $S_{11}$, $S_{12}$.

The charges remaining on the vertical lines L1, L2 and in the capacitors $C_{T1}$, $C_{T2}$ are cleared prior to the signal transfer, and the pulse $\phi V_R(R)$ is turned on to transfer the charges to the accumulating capacitors $C_{T1}$, $C_{T2}$. After said transfer, the signal readout is conducted in a similar manner as in the G signal readout.

The photoelectric converting device of the above-explained embodiment has the following advantages:

(1) When an accumulating capacitor is provided for each vertical signal line, the accumulating time becomes shorter in two of three colors in comparison with the case in which an accumulating capacitor is provided for each photoelectric conversion cell of the line sensor of each color, but the accumulating time can be elongated in relative manner by increasing the readout speed or the horizontal scanning frequency, so that the accumulating times for three colors can be made substantially equal. It has been difficult to achieve a high speed in the conventional circuit, but this drawback can be resolved by the block structure of the readout circuit in the present embodiment;

(2) The device is applicable to various equipment since the readout of each color signal can be independently controllable; and (3) Succeeding signal processing circuitry can be simplified since the output signals are line-sequential.

In the following there is shown an example of the image reading apparatus in which the present invention is applicable.

Figure 6:
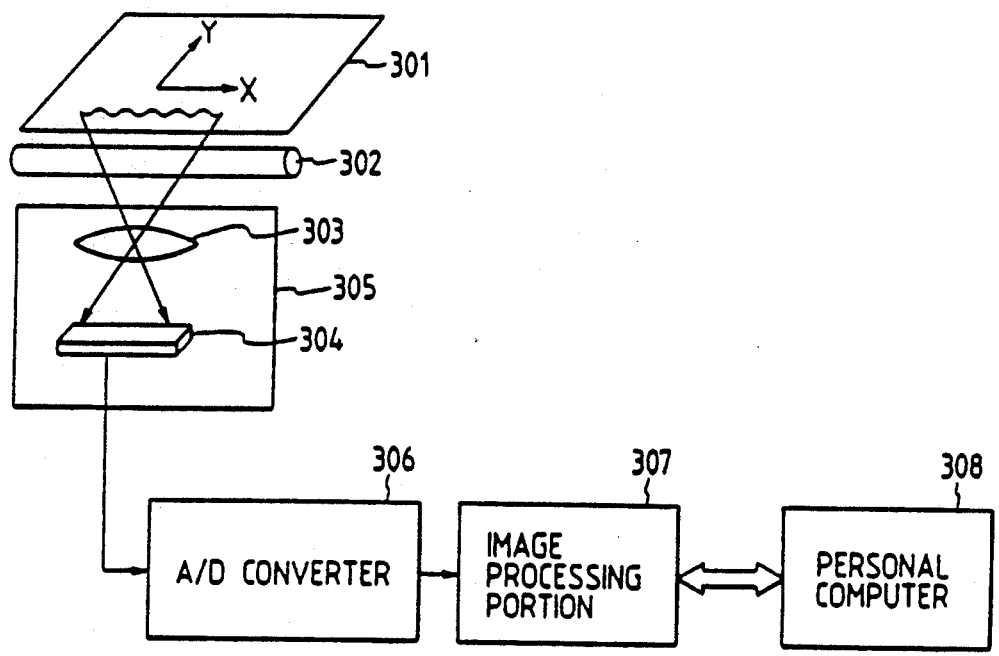
FIG. 6 is a schematic view of an embodiment of the image reading apparatus.

FIG. 6 schematically shows an example of the image reading apparatus.

In FIG. 6, an original document 301 mechanically moves in a direction Y relative to a reading unit 305. The image reading is conducted by scanning with an image sensor 304 in a direction X.

The light from a light source 302 is reflected by the original document 301, and the reflected light is focused in an image sensor 304, through an imaging optical system 303. In the image sensor 304, carriers are accumulated corresponding to the intensity of the incident light, and photoelectrically-converted image signals are thus obtained.

Said image signals are converted into digital signals by an A/D converter 306, and supplied as image data into a memory of an image processing unit 307 for shading correction, color correction etc. The data are then supplied to a personal computer 308 or a printer.

After the image signal transfer of the scanning in the X-direction, the original 301 is moved in the Y-direction, and the above-explained operations are repeated. Thus, the image of the original 301 is converted into electrical signals and output as image data.

As detailed explained in the foregoing, the photoelectric converting device of the present embodiment allows to a reduction of the non-photosensitive area of the line sensor, thereby reducing the dimension of the chip.

Also, the block structure of the readout circuit enables high-speed readout. Furthermore, the device is applicable to various equipment since the readout of the color signals can be independently controlled. Also, the succeeding signal processing circuitry can be simplified, since the output signals are line-sequential.

Figure 7:
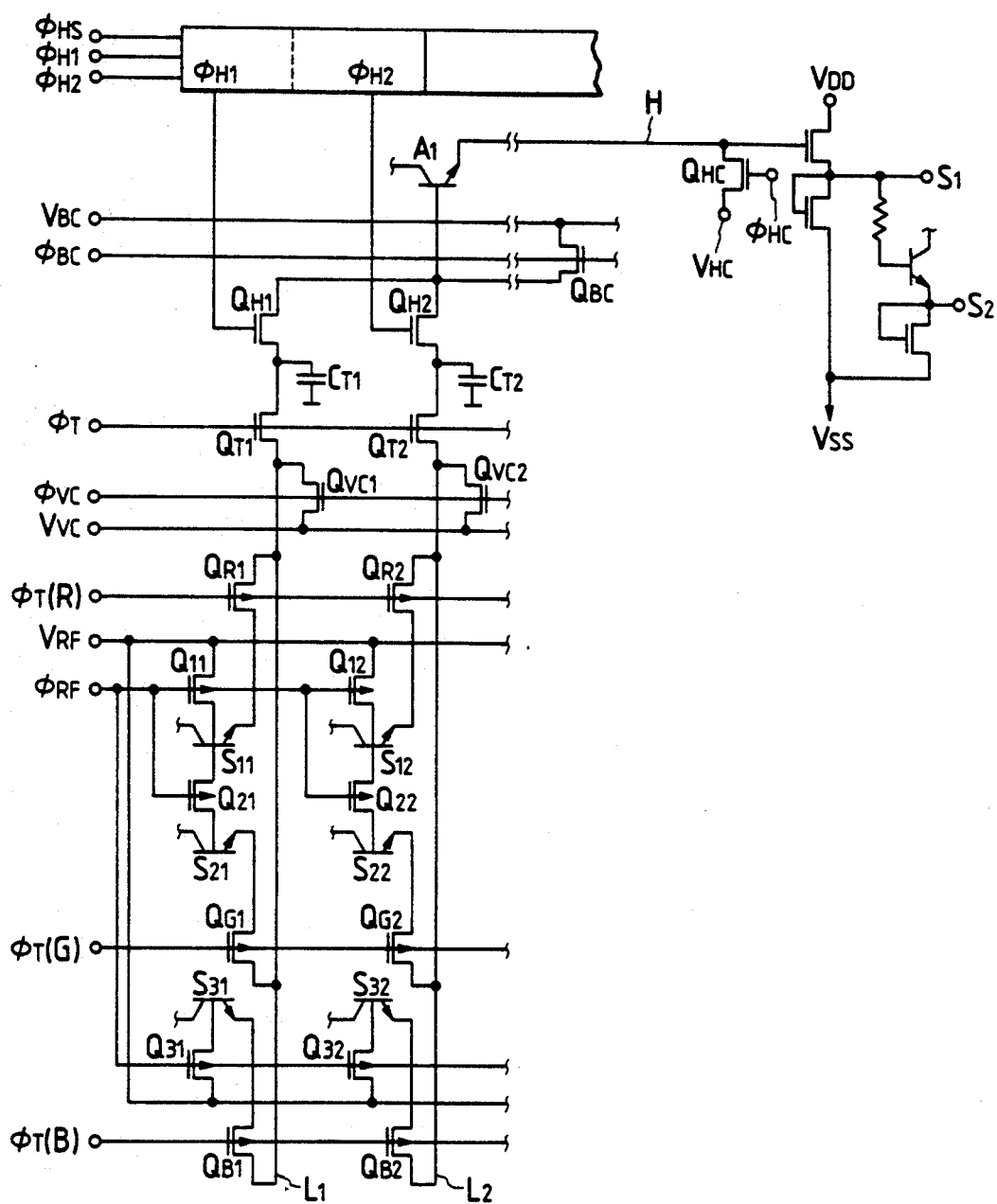
FIG. 7 is a circuit diagram of a second embodiment of the photoelectric converting device of the present invention.

FIG. 7 is a circuit diagram of a second embodiment of the photoelectric converting device of the present invention.

For the purpose of simplicity, there are shown only six npn transistors $S_{11}$–$S_{32}$, constituting the photoelectric conversion cells.

Referring to FIG. 7, the collector electrodes of the npn transistors $S_{11}$–$S_{32}$ constituting the sensors are given a predetermined supply voltage Vcc. The emitters of the npn transistors $S_{11}$, $S_{21}$, $S_{31}$ are commonly connected to a vertical signal line L1 respectively through MOS transistors $Q_{R1}$, $Q_{G1}$, $Q_{B1}$, while those of the npn transistors $S_{12}$, $S_{22}$, $S_{32}$ are commonly connected to a vertical signal line L2 respectively through MOS transistors $Q_{R2}$, $Q_{G2}$, $Q_{B2}$. The gates of the MOS transistors $Q_{R1}$, $Q_{R2}$ receive a readout pulse $\phi_T(R)$; those of the MOS transistor $Q_{G1}$, $Q_{G2}$ receive a readout pulse $\phi_T(G)$; and those of the MOS transistors $Q_{B1}$, $Q_{B2}$ receive a readout pulse $\phi_T(B)$.

The bases of the npn transistors $S_{11}$–$S_{32}$ are respectively connected to MOS transistors $Q_{11}$–$Q_{32}$ whereby said bases can be reset to a reference potential $V_{RT}$ by a pulse $\phi_{RF}$. Also, the npn transistors $S_{11}$, $S_{12}$, $S_{21}$, $S_{22}$ can be mutually separated by the MOS transistors $Q_{21}$, $Q_{22}$, so that the space for pixel separation between the line sensors can be minimized.

The vertical lines L1, 12 are respectively connected to accumulating capacitors $C_{T1}$, $C_{T2}$ through MOS transistors $Q_{T1}$, $Q_{T2}$, and further connected to MOS transistors $Q_{VC1}$, $Q_{VC2}$. The gate electrodes of the MOS transistors $Q_{T1}$, $Q_{T2}$ are connected in common and receive a pulse $\phi_T$. Also, the gate electrodes of the MOS transistors $Q_{VC1}$, $Q_{VC2}$ are connected in common and receive a pulse $\phi_{VC}$. The emitters of the npn transistors $S_{11}$–$S_{31}$ can be given a predetermined voltage $V_{VC}$ by the above-mentioned pulses $\phi_{VC}$, $\phi_T(R)$, $\phi_T(G)$, $\phi_T(B)$.

The accumulating capacitors $C_{T1}$, $C_{T2}$ are connected, through MOS transistors $Q_{H1}$, $Q_{H2}$, to a buffer A1 and a transistor $Q_{BC}$. Said MOS transistors $Q_{H1}$, $Q_{H2}$ are controlled by a horizontal scanning circuit, whereby the charges accumulated in the accumulating capacitors $C_{T1}$, $C_{T2}$ are transferred in succession. The MOS transistor $Q_{BC}$ is controlled by a pulse $\phi_{BC}$.

The buffer is not provided for each accumulating capacitor but is connected in common to plural accumulating capacitors (two in the illustration) for reducing the stray capacitance.

The buffer A1 is connected to an output line H which is connected to an output circuit. Said output line H receives a predetermined voltage $V_{HC}$ through a refreshing transistor $Q_{HC}$.

Figure 9:
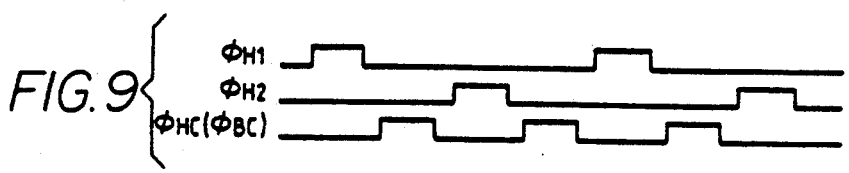
FIGS. 8 and 9 are timing charts showing the functions of the photoelectric converting device of said second embodiment.
Figure 8:
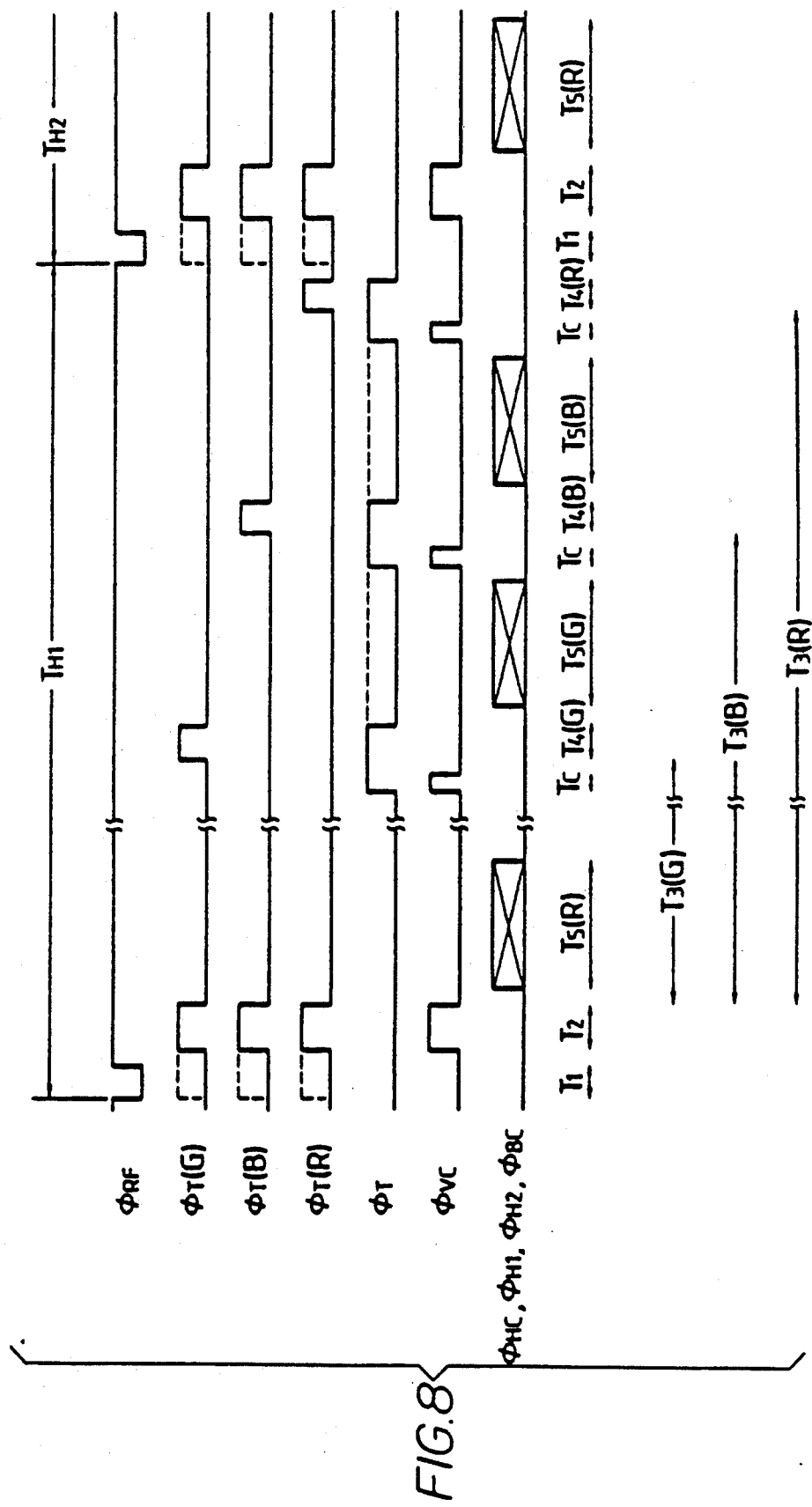

FIGS. 8 and 9 are timing charts showing the functions of the photoelectric converting device of said second embodiment.

In FIG. 8, $T_H$ indicates a cycle period.

At first, the pulse $\phi_{RF}$ is shifted to the L-level state to reset the bases of the npn transistors $S_{11}$–$S_{32}$ to a reference voltage $V_{RF}$. This period is called a complete refreshing period $T_1$.

Then, the MOS transistors $Q_{VC1}$, $Q_{VC2}$ connected to the vertical lines L1, L2 are turned on by a pulse $\phi_{VC}$, and transistors $Q_{R1}$, $Q_{R2}$, $Q_{G1}$, $Q_{G2}$, $Q_{B1}$, $Q_{B2}$ are turned on by the pulses $\phi_T(R)$, $\phi_T(G)$, $\phi_T(B)$, whereby the emitters of the npn transistors $S_{11}$–$S_{32}$ are shifted to a potential $V_{VC}$. The holes accumulated in the base are dissipated by recombination with the electrons injected from the emitter. This period is called a transient refreshing period $T_2$. This transient refreshing operation reduces the base potential, and the fluctuation of base potentials of the npn transistors is thus eliminated.

Then, the transistors $Q_{R1}$, $Q_{R2}$, $Q_{G1}$, $Q_{G2}$, $Q_{B1}$, $Q_{B2}$ are turned off by the pulses $\phi_T(R)$, $\phi_T(G)$, $\phi_T(B)$ whereby the emitters of the npn transistors $S_{11}$–$S_{32}$ are maintained in the floating state.

When the light enters the light-receiving areas of the npn transistors $S_{11}$–$S_{31}$ in this state, carriers (holes in this case) corresponding to the amount of incident light are accumulated in the base (in an accumulating period $T_3$, such an accumulating operation is called forward bias accumulation).

Thus, the npn transistors $S_{11}$–$S_{31}$ can be shifted to the accumulating state by turning off the transistors $Q_{R1}$–$Q_{B2}$. In the photoelectric converting device of the present embodiment, since the emitters of the npn transistors $S_{11}$–$S_{31}$ are insulated from the vertical lines by the MOS transistors $Q_{R1}$–$Q_{B2}$, the signals corresponding to the charges accumulated in the bases of the npn transistors can be selectively read. The signal readout can be started from any line sensor, but, in order to balance, the levels of the color signals as far as possible, the signals are read in the order of green, blue and red in the present embodiment.

After the charge accumulation of the npn transistors $S_{21}$, $S_{22}$ for green color, and prior to the readout of the signals corresponding to the accumulated charges, the MOS transistors $Q_{T1}$, $Q_{T2}$ are turned on by a pulse $\phi_T$ while the MOS transistors $Q_{VC1}$, $Q_{VC2}$ are turned on by a pulse $\phi_{VC}$, whereby the charges remaining the accumulating capacitors $C_{T1}$, $C_{T2}$ are eliminated (Tc in the figure is a charge elimination period).

Subsequently, the pulse $\phi_T(G)$ is shifted to the H-level state to forwardly bias the bases of the npn transistors $S_{21}$, $S_{22}$ for green color, whereby the charges are transferred to the accumulating capacitors in a transfer period $T_4$.

Then, by the scanning function of the horizontal scanning circuit, the charges of the accumulating capacitors $C_{T1}$, $C_{T2}$ are sent to the buffer A1, and the corresponding signals are released from the chip through the output circuit. Said output circuit contains an unrepresented sample-hold circuit, which is controlled by an S/H signal, (the period is indicated by $T_5$).

The charge accumulated in the stray capacitance of the output line H is reset to a predetermined potential $V_{HC}$ at each signal readout from the accumulating capacitors by the pulses $\phi_{H1}$, $\phi_{H2}$ supplied to the horizontal scanning circuit.

Then, the charge accumulation of the npn transistors $S_{31}$, $S_{32}$ for blue color is completed, and there are conducted the transfer and readout of the signals corresponding to the accumulated charges.

Prior to the transfer of signals, the charges remaining on the vertical signal lines L1, L2 and in the accumulating capacitors $C_{T1}$, $C_{T2}$ are cleared, and the pulse $\phi_T(B)$ is turned on to transfer the charges to the accumulating capacitors $C_{T1}$. $C_{T2}$. After the charge transfer, the signal readout is conducted in a similar manner as in the green signals.

After the readout of B singals, there are conducted the transfer and readout of the R signals of the npn transistors $S_{11}$, $S_{12}$.

Prior to the transfer of signals, the charges remaining on the vertical signal lines L1, L2 and in the accumulating capacitors $C_{T1}$, $C_{T2}$ are cleared, and the pulse $\phi_T(R)$ is turned on to transfer the charges to the accumulating capacitors $C_{T1}$, $C_{T2}$. After the charge transfer, the signal readout is conducted in a similar manner as in the green signals.

Figure 10:
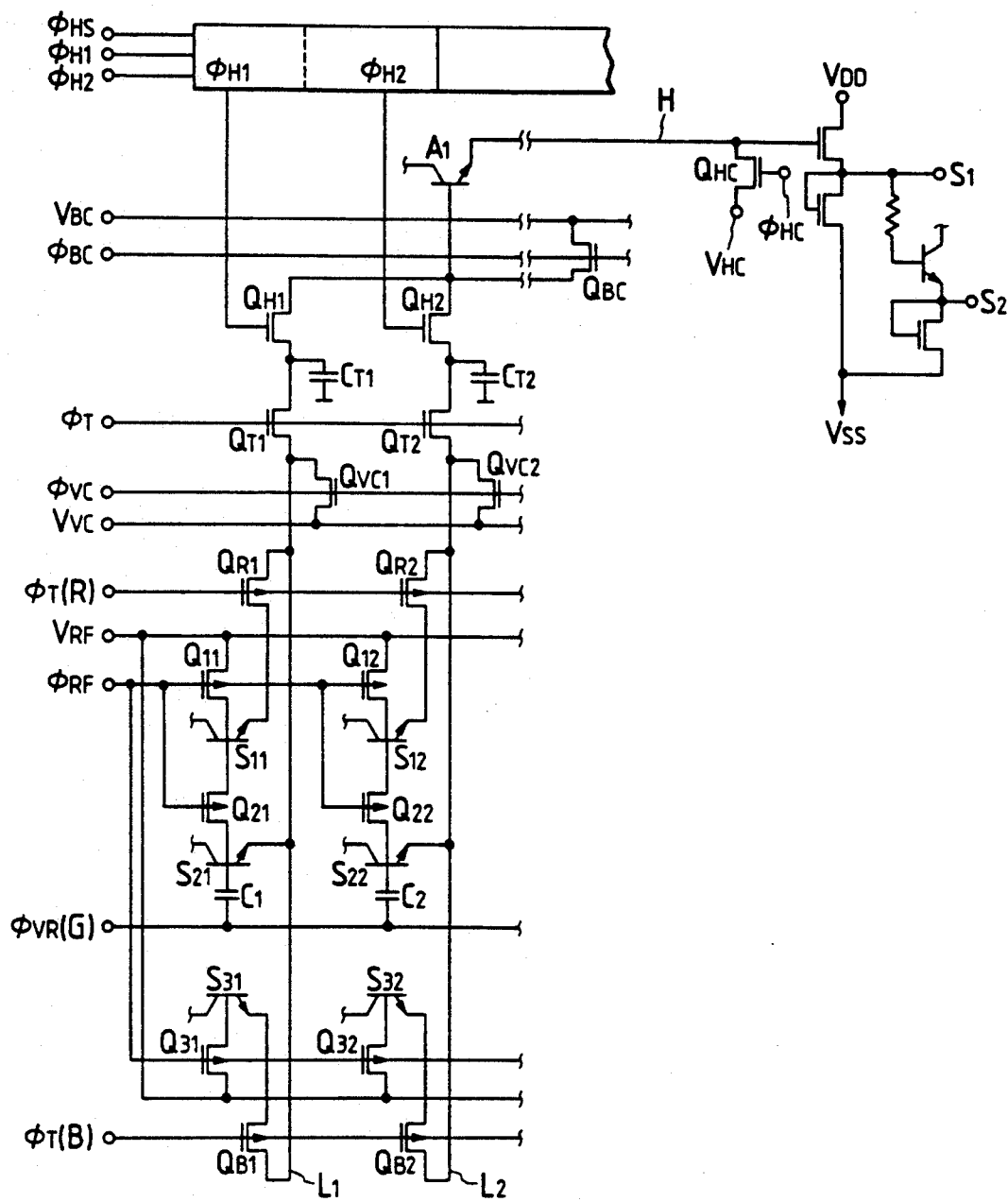
FIG. 10 is a circuit diagram of a third embodiment of the photoelectric converting device of the present invention.

FIG. 10 is a circuit diagram of a third embodiment of the photoelectric converting device of the present invention.

In the present embodiment, the npn transistors $S_{21}$, $S_{22}$ are provided with capacitors at the bases thereof, while the MOS transistors $Q_{G1}$, $Q_{G2}$ in the second embodiment are dispensed with, and capacitor electrodes 209 as shown in FIG. 1(broken-lined) are provided.

In the following description, the same components as those in the 1st embodiment are represented by the same symbols and will not be explained further.

In the photoelectric converting device of the present embodiment, the presence of the capacitor electrodes 209 increases the base capacities and reduces the output signal level, but provides an advantage of simpler structure, since switch means are not needed in the emitters of the npn transistors $S_{21}$, $S_{22}$. In the present embodiment, the capacitor electrodes are provided in the central npn transistors $S_{21}$, $S_{22}$ for reducing the non-photosensitive areas between the color line sensors. Since the light-receiving areas of the npn transistors $S_{21}$, $S_{22}$ show lower output signal level, there are preferably provided a color-separation filter of a color of highest light energy.

In the following, the functions of the above-explained photoelectric converting device will be described. The functions of the components, other than the npn transistors with capacitor electrodes, are same as those in the first embodiment, and will not, therefore, be explained again. Said capacitor electrodes are involved in the transient refreshing, charge accumulation and charge transfer.

Figure 11:
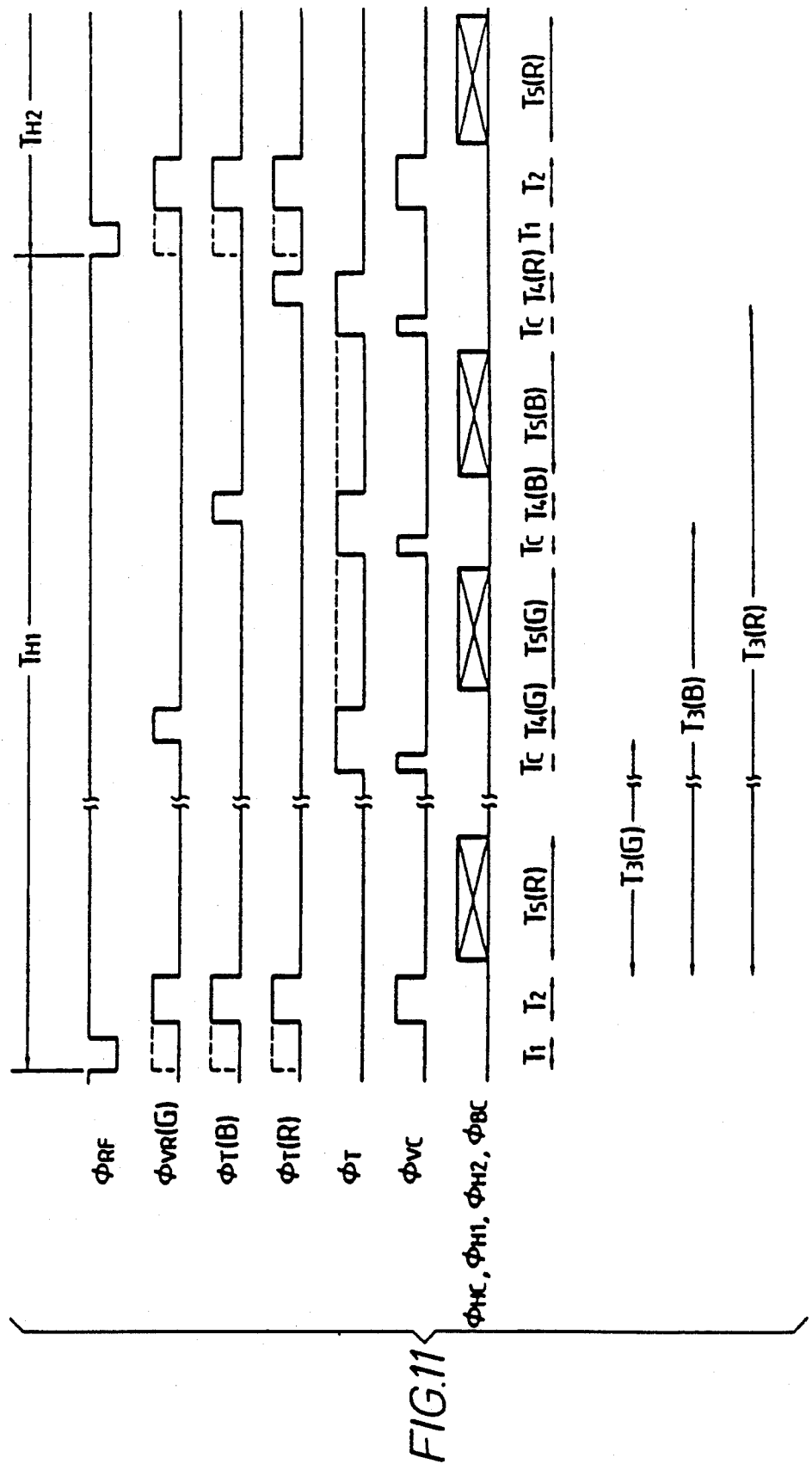
FIG. 11 a timing chart showing the functions of the photoelectric converting device of said third embodiment.

FIG. 11 is a timing chart showing the functions of the 3rd embodiment.

In the transient refreshing period $T_2$, the MOS transistors $Q_{VC1}$, $Q_{VC2}$ connected to the vertical signal lines L1, L2 are turned on by the pulse $\phi_{VC}$ thereby bringing the emitters of the npn transistors $S_{21}$, $S_{22}$ to a potential $V_{VC}$, and the pulse $\phi V_R(G)$ is shifted to the H-level state thereby bringing the bases of the npn transistors $S_{21}$, $S_{22}$ to a predetermined potential $V_B$ ($>V_{VC}$) through the capacitor electrodes. The holes accumulated in the base are dissipated by recombination with electrons injected from the emitter. The transient refreshing is conducted in this manner.

In the accumulation period $T_3$, the pulse $\phi V_R(G)$ is shifted to the L-level state, whereby the base assumes a negative potential inversely biased with respect to the emitter. If the light enters the light-receiving area of the npn transistors $S_{21}$, $S_{22}$, carriers (holes in this case) are accumulated in the bases corresponding to the amount of incident light.

As the bases of said npn transistors $S_{21}$, $S_{22}$ are inversely biased with respect to the emitters, the signal readout does not take place unless the base is forcibly biased in the forward direction with respect to the emitter. It is therefore possible to selectively read the signals corresponding to the charges accumulated in the bases.

In the transfer period $T_4$, the pulse $\phi V_R(G)$ is shifted to the H-level state to elevate the base potentials of the npn transistors $S_{21}$, $S_{22}$ for green color to the forward biased state, whereby the charges are transferred to the capacitors $C_{T1}$, $C_{T2}$.

Figure 12:
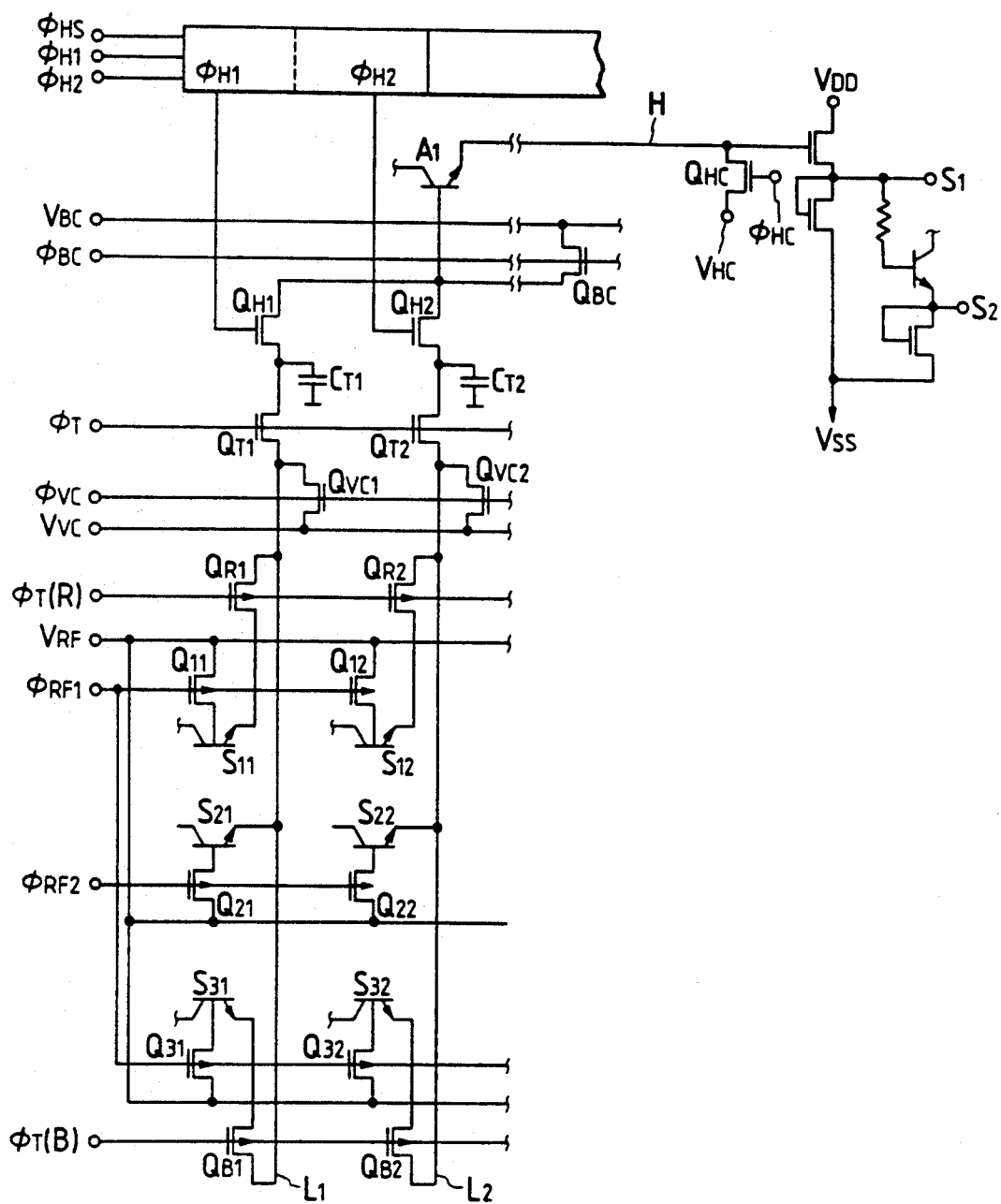
FIG. 12 is a circuit diagram of a fourth embodiment of the present invention.

FIG. 12 is a circuit diagram of a 4th embodiment of the photoelectric converting device of the present invention.

In the present embodiment, the emitters of the npn transistors $S_{21}$, $S_{22}$ are directly connected to the vertical signal lines L1, L2, without the MOS transistors $Q_{G1}$, $Q_{G2}$ in the 2nd embodiment.

In the following description, same the components as in the 3rd embodiment are represented by the same symbols, and will not be explained further.

The photoelectric converting device of the present embodiment is characterized by a further simplified structure, because of the absence of switch means on the emitters of the npn transistors $S_{21}$, $S_{22}$ employed in the 2nd embodiment, and the absence of the capacitor electrodes on the bases of the npn transistors $S_{21}$, $S_{22}$ employed in the 3rd embodiment. More specifically, in the present embodiment, for the purpose of reducing the nonphotosensitive areas between the color line sensors, the emitters of the central npn transistors $S_{21}$, $S_{22}$ are connected to the vertical signal lines L1, L2.

In the following there will be given an explanation on the functions of the present embodiment. Said explanation will not be given on the components which are the same as those in the 2nd embodiment, but on the function of the npn transistors $S_{21}$, $S_{22}$ characteristic of the present embodiment.

Figure 13:
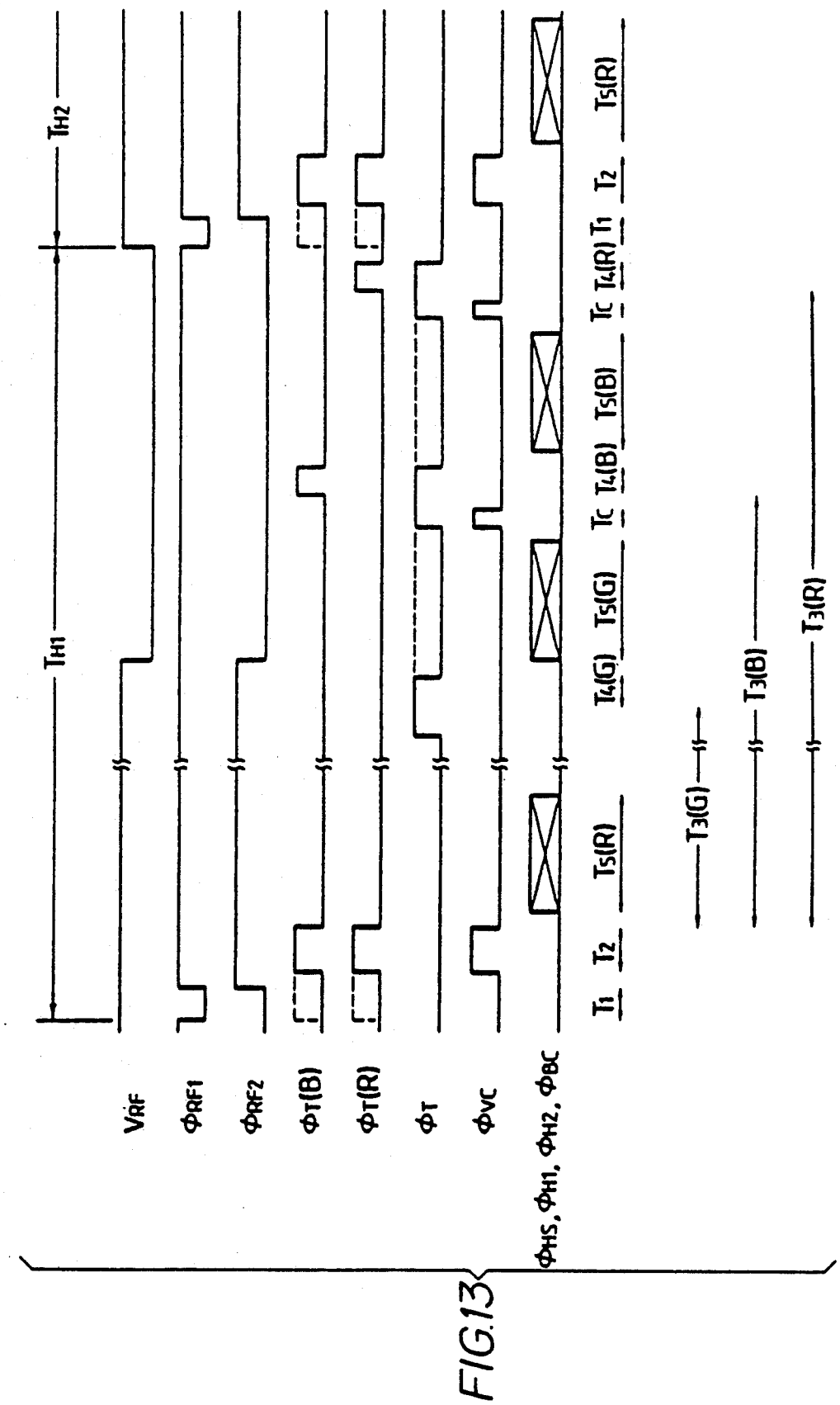
FIG. 13 is a timing chart showing the functions of said fourth embodiment.

FIG. 13 is a timing chart showing the functions of said 4th embodiment.

At first, in the complete refresh period T1, the pulse $\phi_{RF2}$ is shifted to the L-level state for resetting the bases of the npn transistors $S_{21}$, $S_{22}$ to the reference voltage $V_{RF}$.

Then, in the transient refreshing period T2, the MOS transistors $Q_{VC1}$, $Q_{VC2}$ connected to the vertical signal lines L1, L2 are turned on by the pulse $\phi_{VC}$ while the MOS transistors $Q_{21}$, $Q_{22}$ are turned off by the pulse $\phi_{RF2}$ whereby the emitters of the npn transistors $S_{21}$, $S_{22}$ assume a potential $V_{VC}$. In this state the holes accumulated in the bases are dissipated by recombination with the electrons injected from the emitters. This transient refreshing operation reduces the base potential, thus reducing the fluctuation in the base potentials of the npn transistors of the sensor.

Then, in the accumulation period T3, the transistors $Q_{VC1}$, $Q_{VC2}$ are turned off by the pulse $\phi_{VC}$ whereby the emitters of the npn transistors $S_{21}$, $S_{22}$ are maintained in the floating state.

If light enters the light-receiving areas of the npn transistors $S_{21}$, $S_{22}$, carriers (holes in this case) are accumulated in the bases corresponding to the amount of incident light.

Then, in the transfer period T4, the MOS transistors $Q_{11}$, $Q_{12}$ are turned on by the pulse $\phi_T$, whereby the signals corresponding to the npn transistors $S_{21}$, $S_{22}$ of green color are transferred to the accumulating capacitors $C_{T1}$, $C_{T2}$. There is not conducted the charge eliminating operation, in which the remaining charges in the accumulating capacitors $C_{T1}$, $C_{T2}$ are eliminated by turning on the MOS transistors $Q_{VC1}$, $Q_{VC2}$ by the pulse $\phi_{VC}$.

Then, in the readout period T5, the MOS transistors $Q_{21}$, $Q_{22}$ are turned on by the pulse $\phi_{RF2}$ to maintain the bases of the npn transistors $S_{21}$, $S_{22}$ at a predetermined potential or lower. Because said bases are maintained at a predetermined potential or lower, the vertical signal lines to which the emitters of the npn transistors $S_{21}$, $S_{22}$ are connected are not affected. The pulse $\phi_{RF2}$ is maintained on also during the transfer and readout of R and B singals, so that the R and B singals are not affected.

The photoelectric converting device explained above can be utilized in the image reading apparatus as shown in FIG. 6.

As explained in the in detail foregoing, the photoelectric converting device of the 2nd to 4th embodiments has switch means in one of the main electrode areas of each photoelectric conversion cell in the line sensors, for on-off switching of the signals from said cells. Consequently, the signal lines can be connected in common, and the wirings of the line sensors can be simplified. Also, the circuit components such as accumulating capacitors can be used in common, so that it is possible to reduce the nonphotosensitive areas and to decrease the dimension of the chip.

In the following there will be explained a 5th embodiment of the present invention.

Figure 14B:
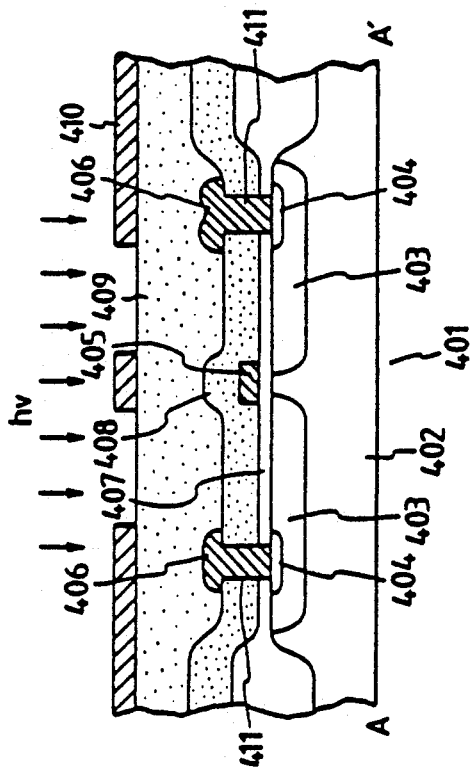
FIGS. 14A, 14B and 14C are views showing a fifth embodiment of the photoelectric converting device of the present invention.
Figure 14C:
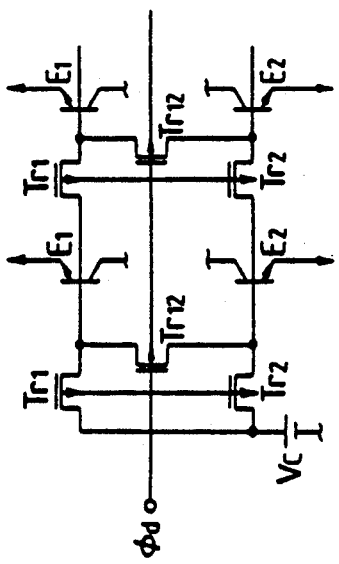
Figure 14A:
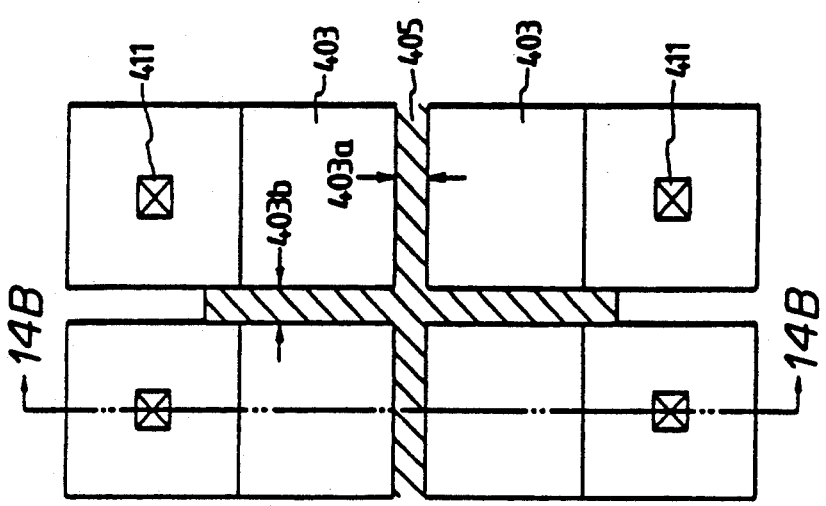

FIG. 14 illustrates the 5th embodiment of the photoelectric converting device of the present invention, wherein FIG. 14A is a schematic plan view, FIG. 14B is a cross-sectional view along a line A—A' in FIG. 14A, and FIG. 14C is an equivalent circuit diagram.

The present embodiment shows a 2-line sensor.

Referring to FIGS. 14A and 14B, on an n-type silicon substrate 401, there is formed, by epitaxial growth, an $n^-$-layer 402 constituting a collector area, in which two p-base areas 403 are formed. In said p-base areas 403, there are respectively formed $n^+$-emitter areas 404 to constitute bipolar transistors. The neighboring p-base areas 403 constitute source and drain areas of a p-channel MOS transistor, of which gate electrode 405 is formed across an oxide film 407. A transparent insulating layer 408 is formed thereon, and emitter electrodes 406 are formed through contact holes 11. A transparent insulating layer 409 is further formed thereon, and an opaque layer 410 is formed thereon.

The p-base areas 403 constitute light-receiving areas, which are separated by the p-channel MOS transistor, which is of the normally-off type. Thus, if the gate electrode 405 is grounded or positive, said MOS transistor is turned off to separate the light-receiving areas, and this fact enables of the device to be made compact without particular separating areas. When the gate electrode 405 assumes a negative potential exceeding a threshold potential Vth, the p-channel MOS transistor is turned on to mutually connect the p-base areas 404 of different cells.

The emitter area 404 constituting the signal output terminal is positioned outside the p-base area 403 constituting the light-receiving area. The absence of said emitter area 404 between the p-base areas 403 allows a reduction of the line space. In addition, the pixels are separated by the p-channel MOS transistors as explained above, so that the line space can be minimized.

The gate electrodes 405 are provided not only in the spaces 403a between the p-base areas 403 as shown in FIG. 14B, but also in the spaces 403b. Stated differently, the p-channel MOS transistors achieve separation not only between different line sensors but also between the photoelectric conversion cells constituting each line sensor.

Now, reference is made to FIG. 14C for an explanation of the functions of the present embodiment.

There are shown p-channel MOS transistors $Tr_1$, $Tr_2$ for separating the different line sensors, and those $Tr_{12}$ for separating the pixels in each line sensor.

At first, a pulse φd is shifted to the L-level state to turn on the p-channel MOS transistors $Tr_1$, $Tr_2$, $Tr_{12}$, thereby bringing the bases of the npn transistors $E_{1n}$, $E_{2n}$ to a potential Vc and dissipating the charges accumulated in the base areas (this operation is called complete refreshing).

Then, the pulse φd is shifted to the H-level state and the emitters of the npn transistors $E_{1n}$, $E_{2n}$ are given a reference potential (<Vc−Vbe) to dissipate the charges remaining in the base areas (this operation is called transient refreshing).

In the present embodiment, the complete refreshing and the transient refreshing are conducted at the same time, because the photoelectric conversion cells are connected in common by the p-channel MOS transistors.

Then, the emitters of the npn transistors $E_{1n}$, $E_{2n}$ are maintained in the floating state, and the base areas are irradiated with light to accumulate the charges therein (this operation is called accumulation).

Then unrepresented readout circuits connected to the emitters of the npn transistors $E_{1n}$, $E_{2n}$ are rendered conductive, whereby amplified signals (voltage signals or current signals) corresponding to the charges accumulated in the base areas are released from the emitters.

FIG. 15 illustrates a 6th embodiment of the photoelectric converting device of the present invention, wherein FIG. 15A is a schematic plan view, FIG. 15B is a cross-sectional view along a line 15B—15B in FIG. 15A, and FIG. 15C is an equivalent circuit diagram.

The present embodiment shows a 2-line sensor.

The present embodiment is characterized by the fact that the p-base areas 403 are separated by a LOCOS oxide film 412, and that the emitter area 404 and the p-channel transistor are positioned outside of the line sensor. The components and functions are the same as those in the foregoing embodiment and will not, therefore, be explained further.

Figure 16A:
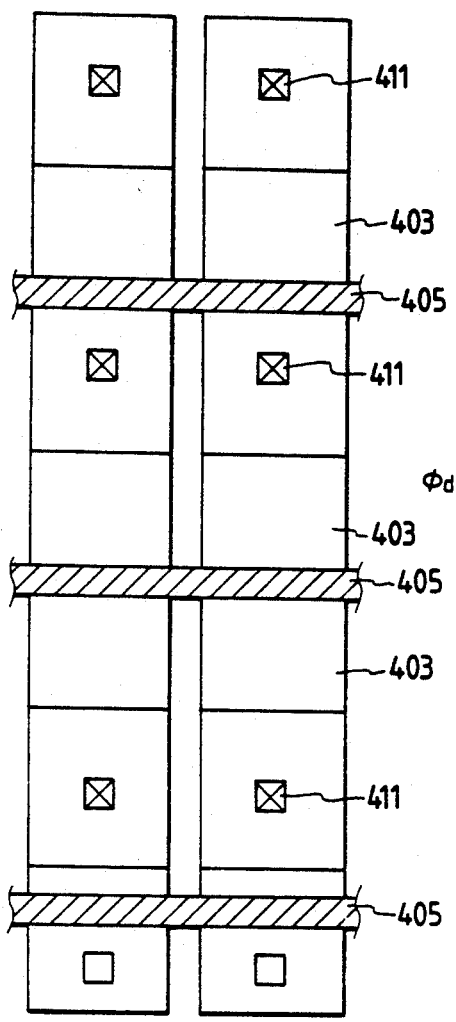
FIGS. 16A, 16B and 16C are views showing a seventh embodiment of the present invention.
Figure 16C:
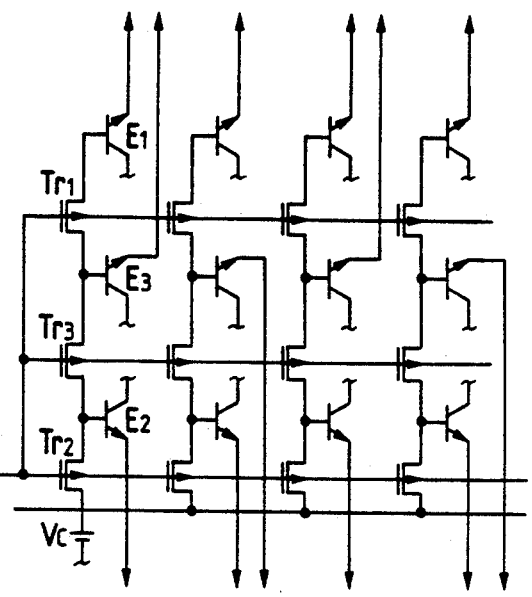
Figure 16B:
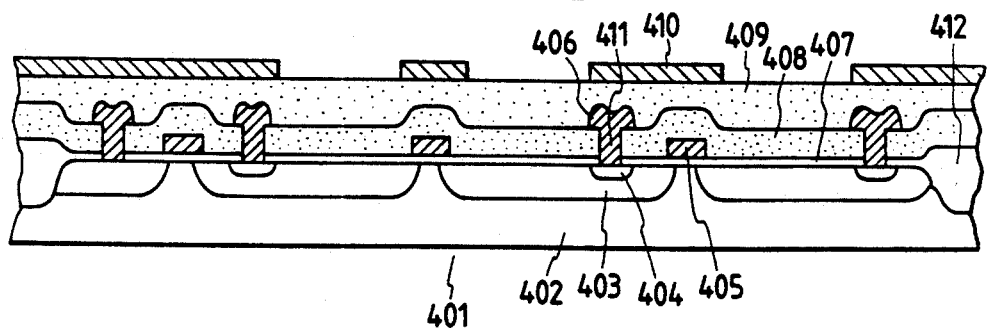
Figure 17:
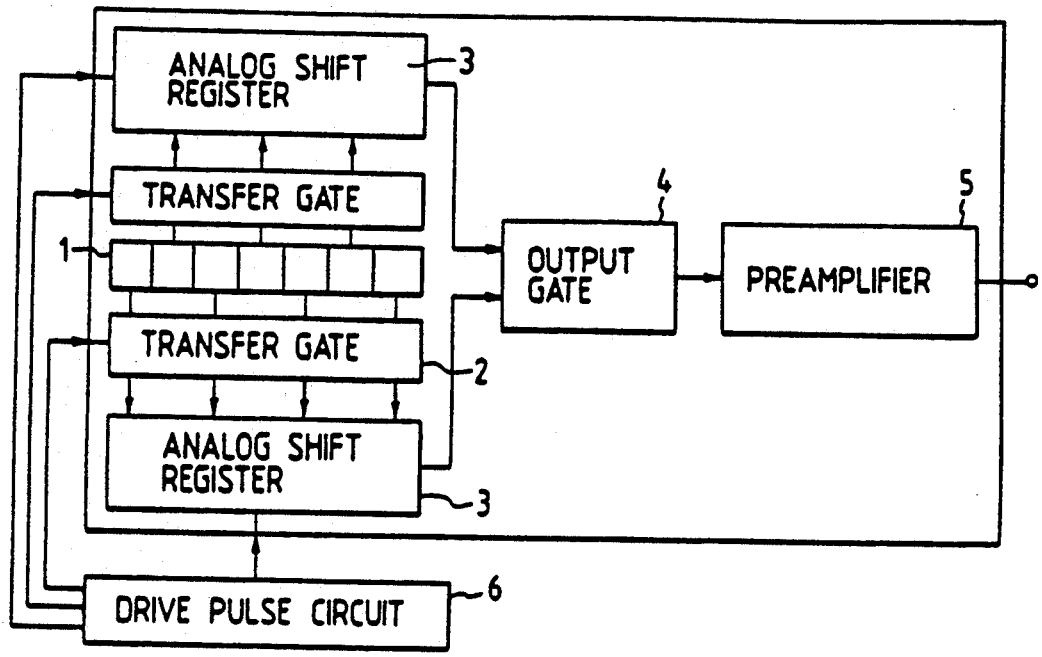
FIG. 17 is a schematic view of an example of the CCD line sensor.
Figure 18:
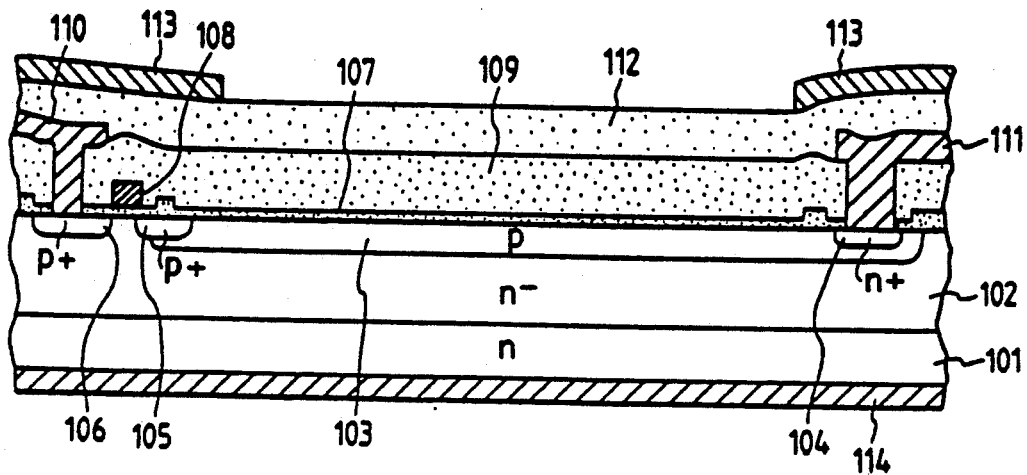
FIG. 18 is a cross-sectional view of a photoelectric conversion cell of the photoelectric converting device.

FIG. 16 illustrates a 7th embodiment of the photoelectric converting device of the present invention, wherein FIG. 16A is a schematic plan view, FIG. 16B is a cross-sectional view, and FIG. 16C is an equivalent circuit diagram.

The present embodiment shows a 3-line sensor.

When the line sensor device has three or more lines, the emitter area 404 and the p-channel transistors can be positioned outside the light-receiving area for the outermost line sensors, but these components are a problem for the inwardly positioned line sensors. More specifically, an additional line space is required if the emitter area is to be positioned closest to the p-base area 403 constituting the light-receiving area, in order to minimize the floating capacity.

In the present embodiment, the emitter area 404 is positioned adjacent to the p-base area 403 of the central line sensor, and is therefore given a space corresponding to a pixel. The neighboring p-base areas 403 are connected with p-channel MOS transistors, which function to separate the pixels and to electrically connect the p-base areas 403.

In the foregoing embodiments, the light-receiving area of the photoelectric conversion cell is composed of a bipolar transistor, but the present invention is likewise applicable to the light-receiving area of other structures such as MOS or SIT.

The foregoing photoelectric converting devices can also be utilized in an image reading apparatus as shown in FIG. 6.

As explained in detail in the foregoing, the photoelectric converting devices of the 5th to 7th embodiments allow the light-receiving areas of the line sensors to be formed in mutually adjacent relationship, thereby reducing the line spaces therebetween. It is therefore possible to make the chip compact, reduce the cost, and facilitate the design because no wirings are required between the line sensors. Furthermore, in the designing of a system, it is possible to increase the memory capacity, because of the reduced line spaces.

The above-mentioned advantages can be further amplified by forming gate-insulated transistors of which main electrode areas are composed of mutually opposed light-receiving areas of neighboring line sensors and/or of adjacent light-receiving areas of each line sensor, thereby achieving pixel separation by said gate-insulated transistors and thus minimizing the line spaces.

What is claimed is:

1. A photoelectric converting device in which a plurality of line sensors are arranged in parallel, each of said plurality of line sensors outputting signals corresponding to a different color, comprising:
   read-out means for sequentially reading out the signals from said plurality of line sensors;
   accumulation means commonly connected to said plurality of line sensors, for accumulating the signals read out from said plurality of line sensors by said read-out means; and
   output means for successively outputting the signals of said accumulation means.

2. A photoelectric converting device according to claim 1, wherein the accumulation time of a charge caused by light irradiation is selected to be different for each of said line sensors.

3. A photoelectric converting device according to claim 1, wherein said accumulation means comprises an accumulating capacitor.

4. A photoelectric converting device according to claim 1, wherein said output means comprises a MOS transistor.

5. A photoelectric converting device according to claim 1, wherein each of said line sensors comprises a photoelectric conversion area utilizing a phototransistor, and a charge transfer area utilizing a MOS transistor.

6. A photoelectric converting device according to claim 5, wherein said phototransistor is inversely biased at the accumulation.

7. A photoelectric converting device according to claim 1, wherein said line sensors are simultaneously refreshed.

8. A photoelectric converting device comprising:
   plural line sensors corresponding respectively to different colors; and
   accumulation means for accumulating the output signals of said plural line sensors;
   wherein said accumulation means comprises an accumulating capacitor;
   wherein said plural line sensors are connected in common with said accumulation means, and the output signals of each line sensor are sequentially transferred to said accumulation means at a predetermined timing.

9. A photoelectric converting device comprising:
   plural line sensors corresponding respectively to different colors; and
   accumulation means for accumulating the output signals of said plural line sensors;

wherein said plural line sensors are connected in common with said accumulation means, and the output signals of each line sensor are sequentially transferred to said accumulation means at a predetermined timing;

wherein each of said line sensors comprises a photoelectric conversion area utilizes a phototransistor and a charge transfer area utilizing a MOS transistor.

10. A photoelectric converting device composed of plural line sensors having photoelectric conversion cells, each cell being composed of a semiconductor transistor composed of two main electrode areas of a same conductive type and a control electrode area of a conductive type opposite to that of said main electrode areas, and in which a charge is accumulated by light irradiation on said control electrode area, said plural line sensors comprising two externally positioned line sensors and one central line sensor, comprising:

switch means provided on one of said main electrode areas in each photoelectric conversion cell of the two externally positioned line sensors, and a capacitor electrode provided, across an insulator, on the control electrode area of each photoelectric conversion cell of the central line sensor so that said externally positioned two line sensors are close to said central line sensor, wherein said device comprises three color line sensors, and wherein said switch means is provided in one of said main electrode areas in each photoelectric conversion cell of the two externally positioned line sensors, but said switch means is not provided in said main electrode areas of the photoelectric conversion cells of the one central line sensor.

11. A photoelectric converting device according to claim 10, wherein said switch means comprises a a MOS transistor.

12. A photoelectric converting device according to claim 10, wherein said main electrode area comprises a MOS transistor.

13. A photoelectric converting device according to claim 10, wherein said control electrode area comprises a phototransistor.

14. A photoelectric converting device composed of plural line sensors having photoelectric conversion cells, each cell being composed of a semiconductor transistor composed of two main electrode areas of a same conductive type and a control electrode area of conductive type opposite to that of said main electrode areas, and in which a charge is accumulated by light irradiation on said control electrode area, said plural line sensors comprising two externally positioned line sensors and one central line sensor, comprising:

switch means provided on one of said main electrode areas in each photoelectric conversion cell of the two externally positioned line sensors, and a capacitor electrode provided, across an insulator, on the control electrode area of each photoelectric conversion cell of the central line sensors so that said externally positioned two line sensors are closed to said central line sensor, wherein the central line sensor is adapted to effect photoelectric conversion of a color of the largest optical energy compared with those of other colors.

15. A photoelectric converting device according to claim 14, wherein said color is green.

16. A photoelectric converting device provided with plural line sensors each composed of plural photoelectric conversion cells linearly arrayed in the main scanning direction; wherein each of said line sensors is adapted to perform photoelectric conversion of a predetermined different color, and the photoelectric conversion cells neighboring in the sub-scanning direction of the neighboring line sensors are connected to a common transfer line, whereby the charges from the photoelectric conversion cells of respective line sensors are transferred through the common transfer line.

17. A photoelectric converting device according to claim 16, wherein each of said line sensors comprises a photoelectric conversion area utilizing a phototransistor, and a charge transfer area utilizing a MOS transistor.

18. A photoelectric converting device according to claim 16, wherein said transfer line comprises a buffer.

19. A photoelectric converting device provided with plural line sensors each having light-receiving areas for accumulating carriers generated by light and output areas for generating output signals corresponding to the thus-accumulated carries, said plural line sensors comprising two outside line sensors and one inside line sensor; wherein the outside line sensors of said plural line sensors are formed in such a way that the light-receiving areas of said outside line sensors are positioned closer to the one inside line sensor than the output areas of the outside line sensors.

20. A photoelectric converting device according to claim 19, wherein each of said light-receiving areas is composed of a drain or source area of a MOS transistor.

21. A photoelectric converting device according to claim 19, wherein each of said output areas comprises the emitter of a bipolar transistor.

22. A photoelectric converting device according to claim 19, wherein each of said line sensors comprises a photoelectric conversion area utilizing a phototransistor, and a charge transfer area utilizing a MOS transistor.

23. A photoelectric converting device provided with plural line sensors each having light-receiving areas for accumulating carriers generated by light and output areas for generating output signals corresponding to the thus-accumulated carriers, said plural line sensors comprising two outside line sensors and one inside line sensor, comprising:

gate insulation transistors for isolating pixels respectively, each transistor having, as electrode areas, at least one of (i) opposed light-receiving areas of adjacent line sensors and (ii) adjacent light-receiving areas of the same line sensor areas, wherein outside line sensors of said plural line sensors are formed in such a way that the light-receiving areas of said outside line sensors are positioned closer to inside line sensors that the output areas of the outside line sensors.

24. A photoelectric converting device according to claim 23, wherein each of said gate-insulating transistors comprises a MOS transistor.

25. A photoelectric converting device provided with plural line sensors each having light-receiving areas for accumulating carriers generated by light, and output areas for generating output signals corresponding to the thus generated carriers, wherein each plural line sensors are arranged in parallel with each other so that the light-receiving areas of said plural line sensors area adjacent to each other, and wherein the light-receiving areas adjacent to each other include light-receiving areas which are adjacent to each other in each line sensor and light-receiving areas which are adjacent to each other between respective line sensors.

* * * * *

UNITED STATES PATENT AND TRADEMARK OFFICE
CERTIFICATE OF CORRECTION

PATENT NO. : 5,262,850
DATED : November 16, 1993
INVENTOR(S) : SEIJI HASHIMOTO

It is certified that error appears in the above-identified patent and that said Letters Patent is hereby corrected as shown below:

COLUMN 4

Line 39, "of" should be deleted.

COLUMN 5

Line 12, "pulse $\phi V_R(B)$" should read --pulse $\phi V_R(B)$.--.
Line 58, "L-level" should read --the L-level--.

COLUMN 6

Line 6, "Then" should read --Then,--.
Line 39, "G cell $S_{21}$, $S_{22}$" should read --G cells $S_{21}$, $S_{22}$--.
Line 53, "sample hold" should read --sample-hold--.

COLUMN 7

Line 45, "in" should read --on--.
Line 61, "detailed explained" should read --explained in detail--.
Line 63, "to" should be deleted.

COLUMN 8

Line 19, "transistor $Q_{G1}$, $Q_{G2}$" should read --transistors $Q_{G1}$, $Q_{G2}$--.
Line 29, "lines L1, 12" should read --lines L1, L2--.

COLUMN 9

Line 24, ",the" should read --the--.
Line 32, "remaining" should read --remaining in--.
Line 63, "B singals," should read --B signals,--.

UNITED STATES PATENT AND TRADEMARK OFFICE
CERTIFICATE OF CORRECTION

PATENT NO. : 5,262,850
DATED : November 16, 1993
INVENTOR(S) : SEIJI HASHIMOTO

It is certified that error appears in the above-identified patent and that said Letters Patent is hereby corrected as shown below:

COLUMN 10

Line 32, "same" should read --the same--.

COLUMN 11

Line 8, "same the" should read --the same--.
Line 19, "nonphotosensitive" should read --non-photosensitive--.
Line 30, "period T1," should read --period $T_1$,--.

COLUMN 12

Line 2, "B singals" (both occurrences) should read --B signals--.
Line 7, "the in detail" should read --detail in the--.
Line 16, "nonphotosensitive" should read --non-photosensitive--.
Line 23, "line A-A'" should read --line 14B-14B--.
Line 36, "contact holes 11." should read --contact holes 411.--.
Line 44, "of" should be deleted.
Line 48, "p-base areas 404" should read --p-base areas 403--.
Line 67, "those $Tr_{12}$" should read --transistors $Tr_{12}$--.

COLUMN 13

Line 9, "(<Vc-Vbe)" should read --($\leq$Vc-Vbe)--.

COLUMN 15

Line 7, "utilizes" should read --utilizing--.
Line 35, "a a" should read --a--.

--

UNITED STATES PATENT AND TRADEMARK OFFICE
CERTIFICATE OF CORRECTION

PATENT NO. : 5,262,850
DATED : November 16, 1993
INVENTOR(S) : SEIJI HASHIMOTO

It is certified that error appears in the above-identified patent and that said Letters Patent is hereby corrected as shown below:

COLUMN 15 (con't)

Line 38, "said main electrode area" should read
--each of said main electrode areas--.
Line 48, "conductive" should read --a conductive--.
Line 58, "closed" should read --close--.

COLUMN 16

Line 19, "carries," should read --carriers,--.
Line 47, "sensor areas," should read --sensor,--.
Line 62, "area" should read --are--.

Signed and Sealed this

Twenty-eighth Day of June, 1994

Attest:

BRUCE LEHMAN

Attesting Officer    Commissioner of Patents and Trademarks